J. R. Luce,
Circular Saw Mill.
No. 105,100.        Patented July 5, 1870.

Witnesses:        Inventor:
       J. R. Luce
       per Alexander Mason
       Atty.

United States Patent Office.

JAMES R. LUCE, OF STEVENS' POINT, WISCONSIN.

Letters Patent No. 105,100, dated July 5, 1870.

IMPROVEMENT IN CIRCULAR-SAW MILLS.

The Schedule referred to in these Letters Patent and making part of the same

*To all whom it may concern:*

Be it known that I, JAMES R. LUCE, of Stevens' Point, in the county of Portage and in the State of Wisconsin, have invented certain new and useful Improvements in Sawing-Machines; and I do hereby declare that the following is a full, clear, and exact description thereof, reference being had to the accompanying drawing and to the letters of reference marked thereon making a part of this specification.

My invention relates to the feeding-mechanism of a sawing-machine, and consists in two tapering friction-rollers placed on two parallel shafts, and connected by two thin rollers on a movable diagonal shaft, whereby the speed of the feeding-carriage is regulated, and also in the arrangement of the devices whereby the motion of the feed is reversed, so as to feed either to or from the saw.

In order to enable others skilled in the art to which my invention appertains to make and use the same, I will now proceed to describe its construction and operation, referring to the annexed drawing, in which—

Figure 1:
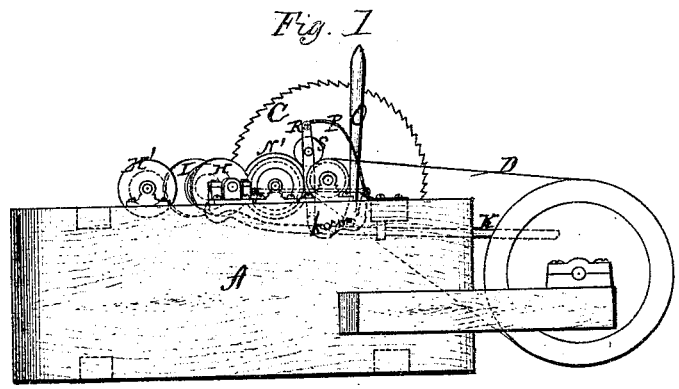

Figure 1 is a side elevation, and

Figure 2:
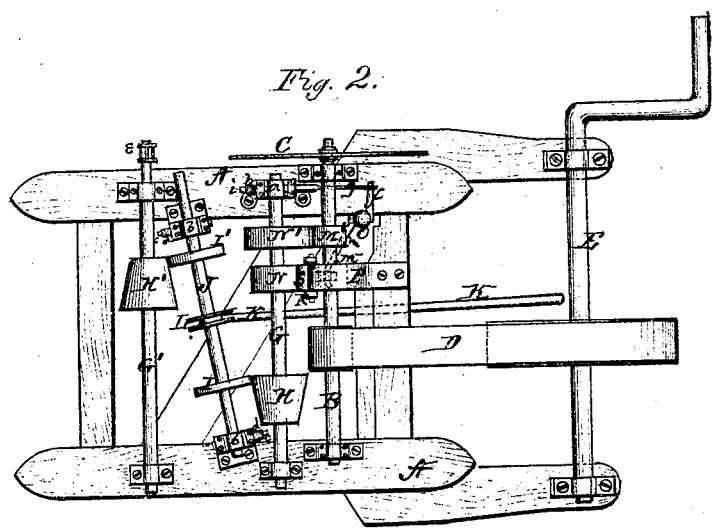

Figure 2 a plan-view of my machine.

A represents the frame of my machine, upon which, in suitable journal-boxes, is placed a shaft, B, carrying at one end the saw C.

Motion is communicated to the saw-shaft B by means of a belt, D, connecting a pulley on the same with a wheel or pulley on the main shaft E, this shaft being turned by hand, steam, or any other known motive power.

In front of the saw-shaft B, on the frame A, is another shaft, G, which has a stationary journal-box at the end furthest from the saw, but at the end nearest the saw its journal-box a is movable, as will be hereinafter described, for the purpose of throwing said shaft in and out of gear with the saw-shaft.

On the shaft G is placed a tapering roller, H, which is touched by a thin roller, I, on the shaft J.

This latter shaft is placed diagonally on the frame A, in movable journal-boxes, b b.

The journal-boxes b b are each provided with an adjustable screw, c, and spring, d, which operate in opposite directions, so as to draw the roller I up to the tapering roller H.

At the opposite end of the shaft J is placed a similar roller, I', which, by the spring d at that journal box b, is drawn close up to another tapering roller, H', placed upon a shaft, G', running in stationary journal-boxes on the frame A, parallel with the shaft G.

At the outer end of the shaft G', on the same side as the saw C, is a pinion, e, which may gear with a saw-carriage, or other suitable mechanism or device for carrying the lumber to or from the saw.

The rollers I I' on the shaft J are so arranged that, when the roller I touches the larger end on the tapering roller H, the roller I' will touch the smaller end of the tapering roller H', and *vice versa*.

The saw running at a uniform speed, the feed-pinion e can be made to revolve faster or slower, at will, by changing the position of the rollers I I' on the tapering rollers H H', because the nearer the roller I is brought to the smaller end of the tapering roller H, the less speed will the feed-pinion have, and the nearer said roller is brought to the larger end the greater will the speed be.

The rollers I I' are at all times brought with equal pressure on the tapering rollers H H' by means of the springs d d and movable boxes b b.

The change in the position of said rollers is effected by means of a lever, K, pivoted to the under side of the frame A, and its front end attached to a grooved pulley, L, on the shaft J. By the use of this lever the shaft J can be moved to either end, the boxes b b being hollow for that purpose.

Upon the saw-shaft B are placed two rollers, M M', and upon the shaft G are two corresponding rollers, N N', the roller N' being, however, larger than the roller N, so that, when the former is brought in contact with the roller M', the latter will not touch the roller M.

The rollers M' and N' are brought in contact with each other by means of a lever, O, pivoted on the inside of the frame A, said lever being provided with an arm, f, which is, by a rod, g, connected with the journal-box a. By pressing the lever O backward, motion is thus communicated to the shaft G, and, through the means already described, to the feed-pinion e, feeding the lumber to the saw.

As soon as the pressure is removed from the lever O, a spring, h, with set-screw, i, attached to the front end of the movable journal-box a, throws the roller N' away from the roller M', instantaneously stopping the feed.

When in this position the feed is reversed by the following means:

A spring, P, secured on the frame A, supports perpendicularly a small frame, R, between the rollers M N, the lower end of said frame having a hook, k, in which rests an arm, m, from the lever O.

In the frame R, above the rollers M N, is a small roller, S. By bearing forward on the lever O the frame R is drawn downward, so that the roller S will come in contact with both of the rollers M and N, and consequently turn the feed in the opposite direction.

As soon as the forward pressure is removed from the lever O, the spring P carries the frame R upward, removing the roller S from the rollers M N, and stopping the feed

Having thus fully described my invention,
What I claim as new, and desire to secure by Letters Patent, is—

1. The combination of the parallel shafts G G', with tapering pulleys H H', and the diagonal shaft J with pulleys I I', all constructed and arranged to operate substantially as and for the purposes herein set forth.

2. The arrangement of the movable journal-boxes $b\ b$, set-screws $c\ c$, and springs $d\ d$, substantially as and for the purposes herein set forth.

3. In combination with the shaft J, rollers I I', journal-boxes $b\ b$, and springs $d\ d$, the lever K and grooved pulley L, substantially as and for the purposes herein set forth.

4. The arrangement of the lever O, with arm $f$, rod $g$, movable journal-box $a$, and spring $h$, all operating substantially as and for the purposes herein set forth.

5. The arrangement of the lever O, arm $m$, hook $k$, frame R, roller S, and spring P, all constructed and operating substantially as and for the purposes herein set forth.

In testimony that I claim the foregoing, I have hereunto set my hand this 26th day of November, 1869.

JAMES R. LUCE.

Witnesses:
H. D. McCULLOCH,
JOHN CADMAN.